Feb. 6, 1968  H. G. TEPP  3,367,745
PREPARATION OF IODINE PENTAFLUORIDE
Filed Feb. 8, 1966  2 Sheets-Sheet 1

FIG.I.

INVENTOR
HANS G. TEPP
BY
*Clement J. Vicary*
ATTORNEY

United States Patent Office 3,367,745
Patented Feb. 6, 1968

3,367,745
PREPARATION OF IODINE PENTAFLUORIDE
Hans G. Tepp, Morris Plains, N.J., assignor to Allied Chemical Corporation, New York, N.Y., a corporation of New York
Continuation-in-part of application Ser. No. 380,797, July 7, 1964. This application Feb. 8, 1966, Ser. No. 525,968
9 Claims. (Cl. 23—205)

ABSTRACT OF THE DISCLOSURE

This application relates to a process for the manufacture of iodine pentafluoride from elemental iodine and fluorine by fluorinating iodine dissolved in an inert solvent medium, preferably iodine pentafluoride. In a first embodiment of the process the quantities of the reactants are controlled by the use of valves connected to photoelectric cells through which the reactants and product of the process are flowed. In a second embodiment of the process of this invention the need for close feed control of the iodine and fluorine reactants is rendered unnecessary by the use of two reaction zones and two holding zones interconnected for flow in such a manner as to insure the complete utilization of all iodine and fluorine introduced into the reaction zones.

---

This invention relates to iodine pentafluoride and more particularly to a new and improved method for the manufacture of iodine pentafluoride.

This application is a continuation in part of my application Serial No. 380,797 filed July 7, 1964, and now abandoned.

Iodine pentafluoride, a known compound, is a colorless liquid which freezes at 9.6° C. and boils at 98° C. and has a specific gravity of 3.15 at 25° C. It may be prepared by passing fluorine gas over a bed of initially solid iodine crystals. The reaction is rapid and exothermic but inefficient as to low fluorine utilization. Despite full water cooling of the reactor tube, the heat of reaction melts and vaporizes iodine in excess of that utilized which tends to contaminate the iodine pentafluoride product with excess iodine. To prevent this, an excess of fluorine is fed to fluorinate all such vaporized iodine with the result that not only is the fluorine utilization low, but also some undesirable $IF_7$ is made; a yield loss of both fluorine and iodine.

An object of the present invention is to produce iodine pentafluoride in a simple, efficient and continuous manner. Another object is to produce iodine pentafluoride in high yield with a high degree of purity. Other objects and advantages will be apparent from the following detailed description.

In accordance with the present invention, there is provided a process for the production of iodine pentafluoride which comprises passing elemental fluorine in contact with a solution of dissolved iodine in an inert solvent medium to convert the elemental fluorine and iodine into iodine pentafluoride.

Figure 1:
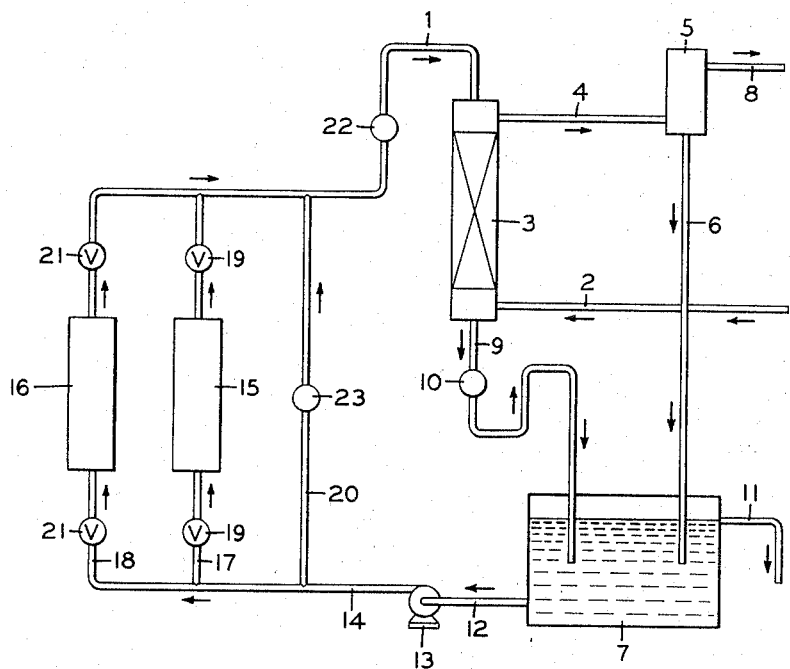

FIGURE 1 of the accompanying drawings diagrammatically illustrates a method of practicing the process of this invention.

Figure 2:
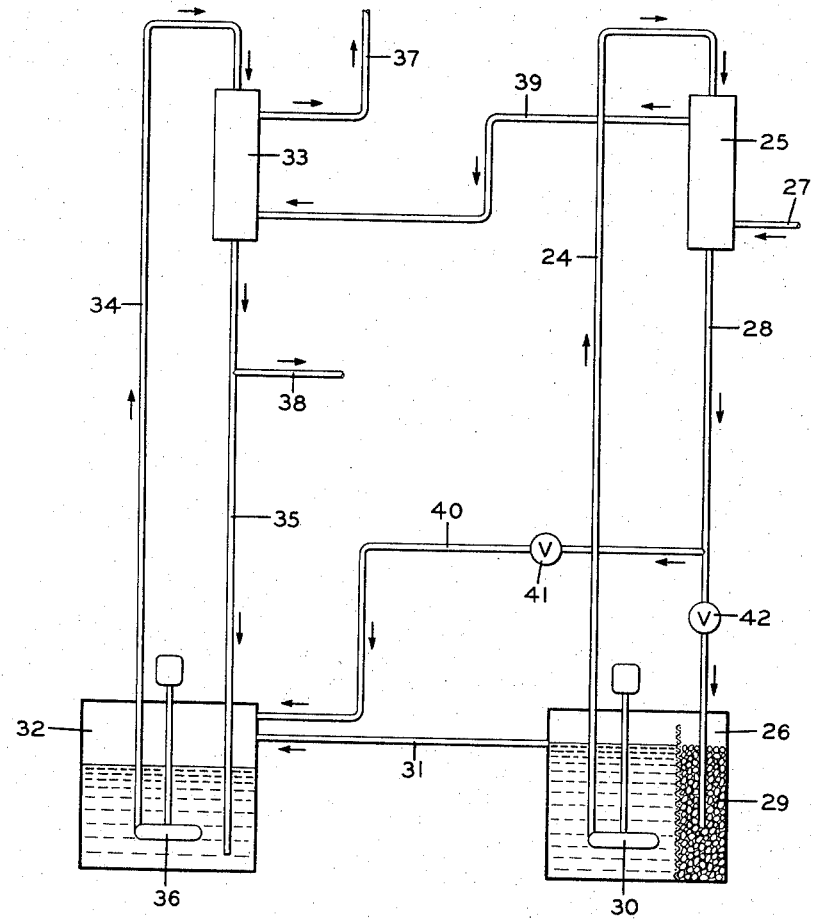

FIGURE 2 of the accompanying drawings diagrammatically illustrates the preferred method of practicing the process of this invention.

Generally, practice of the invention includes subjecting iodine dissolved in a liquid inert medium to the action of gaseous fluorine at substantially atmospheric pressure and at a temperature within the range of 10 to 98° C. preferably 20 to 60° C. in quantity and for a time sufficient to fluorinate the iodine in the inert solvent to form the desired iodine pentafluoride product and recovering the latter from the resulting reaction products. More particularly, gaseous fluorine is continuously metered and fed into a suitable reactor where it is passed countercurrent and in contact with about 0.1 to 5.0% preferably 0.4 to 1.0% by weight iodine dissolved in an inert solvent medium to form iodine pentafluoride.

The reaction involved in practice of the invention may be represented by

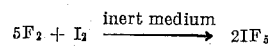

$$5F_2 + I_2 \xrightarrow{\text{inert medium}} 2IF_5$$

The solvent employed according to the process of the invention may be any solvent which is inert to the reactants, the reaction products, and the equipment utilized. In addition, the solvents should be capable of dissolving iodine in an amount of up to about 5.0% by weight. Examples of suitable solvents include $SbF_5$ and iodine pentafluoride. $BRF_3$, although not inert, can also be used as a solvent.

Iodine pentafluoride is the preferred solvent. The iodine reactant may be dissolved in the iodine pentafluoride by any suitable procedure known in the art. For example, the iodine pentafluoride may be circulated through iodine-laden leach vessels wherein the circulated iodine pentafluoride liquid would pick up and dissolve the iodine in an amount of up to about 5.0% by weight of iodine. Alternatively, the iodine may be fed into a circulating solvent via vaporization thus replacing the leach vessels.

With regard to mole ratio of fluorine to iodine, theoretical requirements are approximately five moles of fluorine to one of iodine. Larger amounts of fluorine that is, more than five moles of fluorine per mole of iodine may be employed, however, larger amounts of an excess of six moles of fluorine tend to pass unreacted through the reactor thus causing a loss of valuable fluorine gas. An amount of less than 5 moles of fluorine per mole of iodine does not give as satisfactory results due to iodine contamination of product. For best results, it is preferred to employ 5 to 5.5 moles of fluorine per mole of iodine. The temperature at which the reaction takes place is within the range of 10 to 98° C. preferably 20 to 60° C. Temperatures substantially in excess of these temperatures tend to increase the formation of by-products and are, therefore, not desirable.

Although the process can be operated at sub-atmospheric and superatmospheric pressure, an important advantage of the operation is that the process can be conducted at substantially atmospheric pressure to about 15 p.s.i.g. The reaction between fluorine and iodine is almost instantaneous. However, the contact time may be varied considerably without noticeable disadvantage. Generally, increasing contact time and reaction temperature results in higher reactivity. Significant conversions are effected at contact times as short as 3 seconds and contact time may be as high as 60 seconds.

The operation of the process may be conducted either batch-wise or in a continuous manner. In a preferred procedure, a body of iodine pentafluoride is contained in a tank, equipped with provision for continuously drawing off a portion of iodine pentafluoride which is circulated through iodine leach vessels for iodine pickup. The iodine-laden iodine pentafluoride is then passed through a reactor in countercurrent contact with fluorine gas and iodine pentafluoride is discharged from the reactor into the tank where a portion substantially equal in weight to the iodine pentafluoride made in the reactor is continuously drawn off as product.

Referring more particularly to FIGURE 1, an iodine solution of iodine pentafluoride containing about 0.1 to 1½% iodine by weight is introduced through line 1 into the top of reaction vessel 3 in countercurrent contact with fluorine gas entering the bottom of the reaction vessel through line 2. The reaction vessel employed is desirably of the type which contains an inert packing material such as nickel helices or raschig rings to disperse the liquid iodine pentafluoride so that better contact between the fluorine gas and iodine is effected. The column is fabricated from a material which is inert or substantially inert to the reactants and the reaction products. Suitable materials include monel, stainless steel, mild steel, Inconel and Hastelloy C. In order to maintain the temperatures within the desired range for the reaction, the reaction vessel is equipped with provision for cooling such as a cooling jacket surrounding the reaction vessel through which a cooling medium such as water flows.

Under the technique of operation, the iodine pentafluoride flows down the reaction vessel 3 countercurrent and in contact with the upflowing fluorine gas causing a reaction between the fluorine gas and the iodine contained in the iodine pentafluoride. By this procedure, the exothermic effect of the reaction is minmized because the heat produced by the reaction is dissipated in the iodine pentafluoride solvent and together with the cooling means of the reaction vessel, the temperature may be easily maintained within the desired range of about 20 to 60° C. The pressure within the reaction vessel is substantially atmospheric pressure, although higher or lower pressures may be employed if desired. Normally by the reaction of iodine and fluorine there is produced in addition to the desired iodine pentafluoride product quantities of iodine heptafluoride, particularly at higher temperatures. As a result of the employment of iodine pentafluoride as a solvent for the iodine reactants, however, the formation of iodine heptafluoride is minimized. Vapors of iodine heptafluoride formed in the reaction together with any unreacted fluorine gas resulting from process upsets destroying the ratio of fluorine to iodine in the feeds are discharged from reaction vessel 3 through line 4 and into vessel 5. Generally, iodine heptafluoride and fluorine react with iodine to produce iodine pentafluoride. Thus, by passing the gaseous iodine heptafluoride and fluorine from the reaction vessel 3 in contact with iodine crystals contained in cleanup vessel 5, the iodine heptafluoride and fluorine is converted to iodine pentafluoride adding to the yield of the desired product. The cleanup vessel is preferably constructed of an inert material such as monel and is equipped with provision for containing iodine crystals. For this purpose, there may be employed a basket constructed of a monel screen which is suspended in the vessel to permit the impurities to pass through in contact with the iodine contained in the basket. The iodine pentafluoride which is formed by passing the impurities in contact with the iodine is discharged from cleanup vessel 5 through line 6 and is introduced into product tank 7. Any noncondensable wastes which have not been converted to iodine pentafluoride leave cleanup vessel 5 through line 8.

The iodine pentafluoride formed in the reactor 3 is discharged through line 9 and flows through a photometer 10. The photometer employed may be of the conventional type having a sight glass and means for emitting a light beam on one side which contacts a photosensitive cell on the opposite side. The photosensitive cell senses the amount of light transmission which passes through the sight glass. The degree or amount of light transmission is directly related to the quantity of free iodine in the iodine pentafluoride solution. The iodine pentafluoride is normally a clear and water-white liquid. Thus, the photometer can be used to control the feed of fluorine based on the discoloration of clear water-white iodine pentafluoride by excess iodine, varying in degrees of deep red to colorless in going from 1% iodine in excess to none. If there is an excess of iodine in the products as determined by the color of the product, the flow of fluorine gas is increased or the concentration of iodine entering through line 1 is reduced. The product iodine pentafluoride leaving the photometer 10 enters product tank 7 where the iodine pentafluoride is maintained at a fixed level by means of an overflow pipe 11 through which the iodine pentafluoride is continually being discharged during operation of the process. The iodine pentafluoride produced according to the process is in a high degree of purity. However, if further purification is desired, the product may be directed to a suitable distillation apparatus, not shown, to remove possible hydrogen fluoride, iodine, or fluorine contamination. A portion of the iodine pentafluoride in the product tank containing little or no dissolved iodine is continuously withdrawn from product tank 7 through line 12 by means of pump 13 where it is directed through line 14 for iodine pickup for use in the process. In continuous operation, there may be provided a plurality of leach vessels 15 and 16 containing iodine crystals and the iodine pentafluoride solution is continuously introduced into the leach vessels 15 and 16 entering through lines 17 and 18 respectively in contact with the iodine crystals until the desired weight of iodine in solution is reached. The technique of operation is such that when one of the leach vessels is not in operation, the flow of the iodine pentafluoride may be stopped by means of valves 19 or 21. The iodine pentafluoride containing the dissolved iodine leaves the leach vessels 15 and 16 through lines 19 and 21 respectively and enter line 1 where they are passed through another photometer 22, where the color of the iodine pentafluoride liquid is checked. Iodine pentafluoride liquid may bypass leach tanks 15 and 16 through line 20 where it is desired to lower the iodine concentration in the iodine pentafluoride solution. The flow of iodine pentafluoride liquid through line 20 may be controlled by means of valve 23. The iodine pentafluoride liquid leaving the photometer 22 continues its path along line 1 and is introduced into the top of reaction vessel 3.

In another and more preferred technique, elemental fluorine is continuously passed in contact with iodine pentafluoride containing dissolved iodine in a first reaction zone to effect reaction of the elemental fluorine and iodine to produce iodine pentafluoride. The iodine pentafluoride is continuously discharged from the first reaction zone and directed back to a first holding zone containing a body of iodine pentafluoride and a source of iodine, while any unreacted fluorine is passed to a second reaction zone as explained hereinafter.

A portion of the iodine pentafluoride in the first holding zone is directed back to the first reaction zone for contact with fluorine gas and another portion of iodine pentafluoride in the first holding zone is withdrawn and directed to a second holding zone containing a body of iodine pentafluoride having small amounts of iodine dissolved therein. The iodine pentafluoride in the second holding zone containing small amounts of iodine is continuously discharged and directed to a second reaction zone where it is passed countercurrent with unreacted fluorine gas from the first reaction zone to effect reaction of fluorine and iodine to produce iodine pentafluoride. Iodine pentafluoride is discharged from the second reaction zone and a portion directed back to the second holding zone while the remaining portion is directed to a distillation procedure, not shown, for further purification if desired. Any unreacted fluorine gas discharged from the second reaction zone may be recirculated back to the first reaction zone.

By employing this process scheme, no feed control of the iodine and fluorine reactants is necessary. The iodine content of the iodine pentafluoride is always maintained at the level of saturation for the operating temperature in the first holding zone by having a source of iodine such as iodine crystals in excess contained in the first holding zone. The iodine-laden iodine pentafluoride in the first holding zone is then circulated at full rate in contact with fluorine gas in the first reaction zone wherein the fluorine gas at any practical rate passes into the first reaction zone in contact with the dissolved iodine of the liquor. Any unreacted fluorine or iodine pentafluoride vapor passing out of the first reaction zone continues into a second reaction zone where either component is absorbed or reacted by the circulating liquor from the second holding zone. The "make" of iodine pentafluoride accumulates in the first holding zone until it overflows to the second holding zone carrying with it some iodine in solution thus, automatically providing some iodine for reaction in the second reaction zone. In this manner, no control over iodine concentration is necessary for its constant excess in the mass of iodine pentafluoride circulated through the first reaction zone is always ample to react with the virgin fluorine feed. Another advantage of this operation is that the system can be operated at temperatures from about 10° C. up to the actual boiling point of the iodine pentafluoride (calculated at about 98° C. at a latm. pressure), although temperatures within the range of 20 to 60° C. are preferred. The higher the temperatures employed in the reaction, the greater the solubility of the iodine in the iodine pentafluoride and depending on the temperatures for the reaction, there may be dissolved in the iodine pentafluoride liquid an amount of iodine within the range of 0.1 up to about 5% by weight iodine dissolved in the iodine pentafluoride.

Referring to FIGURE 2, there is illustrated a two-stage reaction process comprising a first stage including a first reaction zone 25 and a first holding zone 26. Iodine pentafluoride containing dissolved iodine is introduced through line 24 into the top of first reaction zone 25 in countercurrent contact with fluorine gas entering the lower part of the first reaction zone through line 27. The first reaction zone employed is similar to the reaction vessel previously described and is equipped with provision for cooling the reaction in order to maintain the temperature within the desired range for reaction. In addition, the first reaction zone is provided with baffles disposed there within so that better contact between the fluorine gas and iodine pentafluoride is effected.

Under the technique of operation, the iodine pentafluoride flows down the first reaction zone 25 countercurrent and in contact with the upflowing fluorine gas causing a reaction between the fluorine gas and the iodine contained in the iodine pentafluoride. Temperatures up to the actual boiling point of iodine pentafluoride (ca. at about 98° C. at latm. pressure) may be maintained in the reaction zone 25 without seriously effecting the process efficiency. At higher temperatures, the amount of iodine concentration level in the iodine pentafluoride increases due to increased solubility and may reach a level of about 5% iodine by weight dissolved in the iodine pentafluoride solution. The pressure within the first reaction zone 25 is substantially atmospheric pressure authough higher or lower pressures may be employed if desired. The iodine pentafluoride which is produced in the reaction of fluorine and iodine is discharged from first reaction zone 25 through line 28 and thereafter enters a first holding zone 26. First holding zone 26 is equipped with provision for supplying a source of iodine to the iodine pentafluoride. For this purpose, there is provided a chamber or baffle section 29 which contains iodine crystals. The chamber or baffle section may take the form of a screen constructed of an inert material into which are added iodine crystals. By passing the iodine pentafluoride from first reaction vessel 25 through the baffle section 29 in contact with the iodine crystals, the iodine content of the iodine pentafluoride solution is maintained at the level of saturation depending upon the operating temperature. Additional cooling is provided in first holding zone 26 to maintain the desired temperature level.

In addition, the iodine pentafluoride contained in first holding zone 26 is maintained at a fixed level by means of an overflow through which the iodine pentafluoride is continuously being discharged during operation of the process. A portion of the iodine pentafluoride solution contained in first holding zone 26 is recirculated to the first reaction zone 25 through line 24 by means of a pump 30 which is disposed within first holding zone 26 while another portion of the iodine pentafluoride is passed through line 31 and into a second stage. The second stage comprises a second reaction zone 33 and a second holding zone 32 of similar constitution and design as in the first stage. The iodine pentafluoride contained in second holding zone 32 is discharged through line 34 by means of pump 36 and enters the upper portion of second reaction zone 33 where the iodine pentafluoride passes in countercurrent contact with fluorine gas which enters the lower part of the reaction zone through line 39. As illustrated in FIGURE 2 of the drawings, the fluorine gas which enters second reaction zone 33 is the unreacted fluorine gas which is discharged from the first reactor 25 although if desired, fluorine gas from an external source may be employed. Second reaction zone 33 is similar to the reaction vessel previously described and is also equipped with provision for cooling the reaction in order to maintain the temperature within the desired range for reaction. Any remaining unreacted fluorine gas in the second reaction zone passes through line 37 together with minor amounts of impurities where it is recovered and if desired recycled back to the first reaction zone 25. Iodine pentafluoride produced in second reaction zone 33 is discharged through line 35 and directed back to the second holding zone 32. The product iodine pentafluoride is discharged from the second stage through line 38 where, if desired, further purification may be effected, such as, for example, by passing the iodine pentafluoride to a suitable distillation apparatus, not shown, to remove possible hydrogen fluoride, iodine, iodine heptafluoride, or fluorine contamination.

Either the entire amount, or a portion of the iodine pentafluoride leaving first reaction zone 25 through line 28 and containing small amounts of iodine may be directed to the second holding zone 32 through line 40. Control of feed may be effected by use of valves 41 and 42. This would be advantageous where it is desired to employ an iodine pentafluoride solution in second holding zone 32, which solution contains less amounts of iodine dissolved in iodine pentafluoride than the iodine pentafluoride solution from the first holding zone 26.

The following examples illustrate the invention.

Example 1

In an operation as illustrated in FIGURE 1, iodine pentafluoride containing about 0.5% iodine by weight was introduced into a reactor packed with raschig rings at a rate of 30.5 gallons per hour in countercurrent contact with fluorine gas fed to the reactor at a rate of three pounds per hour. The reactor equipment was sized to give a contact time between the reactants of about 18 seconds and the temperature in the reaction zone was maintained at about 20 to 60° by the iodine pentafluoride solvent and by water cooling. The iodine pentafluoride was continually discharged from the reactor into a product tank where about seven pounds per hour of product iodine pentafluoride was collected by overflow.

A portion of the iodine pentafluoride in the product tank was pumped through a leach vessel containing solid iodine crystals suspended in a wire basket. The liquid iodine pentafluoride dissolved iodine up to a concentration of about 1% by weight and was admixed with a portion of iodine pentafluoride which by-passed the leach vessel to yield a concentration of iodine in iodine pentafluoride of about 0.5% by weight. The diluted stream was thereafter passed into the top of the reaction vessel in countercurrent contact with fluorine gas. According to the above procedure, the yields on both fluorine and iodine feeds were about 99%.

Example 2

In an operation as illustrated in FIGURE 2, iodine pentafluoride containing about 0.5% iodine by weight was introduced into a first reaction zone at a rate of 600 gallons per hour in countercurrent contact with fluorine gas fed into the first at a rate of 25 pounds per hour. The reactor reaction zone was sized to give a contact time between the reactants of about 5 seconds and the temperature in the first reaction zone was maintained at about 20 to 60° C. by the iodine pentafluoride solvent and by water cooling.

Although certain preferred embodiments of the invention have been disclosed for purpose of illustration, it will be evident that various changes and modifications may be made therein without departing from the scope and spirit of the invention.

I claim:

1. A process for producing iodine pentafluoride from elemental fluorine and iodine which comprises introducing elemental fluorine in contact with iodine dissolved in an inert solvent to effect reaction between the elemental fluorine and iodine to produce iodine pentafluoride.

2. A process for producing iodine pentafluoride from elemental fluorine and iodine which comprises introducing elemental fluorine in contact with a solution of about .1 to 5.0% by weight iodine in iodine pentafluoride at a temperature within the range of 10 to 98° C. to effect reaction between the elemental fluorine and iodine to produce iodine pentafluoride.

3. The process of claim 2 in which the mole ratio of fluorine to iodine is 5.0:1 to 5.5:1.

4. A process for producing iodine pentafluoride from elemental fluorine and iodine which comprises introducing elemental fluorine in countercurrent contact with a solution of about 0.4 to 1.0% by weight iodine in iodine pentafluoride at a temperature within the range of 20 to 60° C. and a mole ratio of fluorine to iodine of 5.0:1 to 5.5:1 to effect reaction between the elemental fluorine and iodine to produce iodine pentafluoride.

5. A process for producing iodine pentafluoride from elemental fluorine and iodine which comprises continuously passing elemental fluorine in contact with a body of iodine pentafluoride containing dissolved iodine in an amount of about 0.4 to 1.0% by weight in a reaction zone maintained at a temperature of 20 to 60° C. to effect reaction of the elemental fluorine and iodine to produce iodine pentafluoride, continuously discharging the iodine pentafluoride from the reaction zone, withdrawing a portion of the discharged iodine pentafluoride withdrawing another portion of the iodine pentafluoride, dissolving iodine in said second portion and returning said second portion of iodine pentafluoride containing dissolved iodine to the reaction zone in contact with additional fluorine.

6. A process for producing iodine pentafluoride from elemental fluorine and iodine which comprises continuously passing elemental fluorine in contact with iodine pentafluoride containing dissolved iodine in an amount of about .1 to 5% by weight in a first reaction zone maintained at a temperature of 10 to 98° C. to effect reaction of the elemental fluorine and iodine to produce iodine pentafluoride, continuously discharging unreacted fluorine gas, continuously discharging the iodine pentafluoride from the first reaction zone and introducing said iodine pentafluoride solution into a first holding zone, dissolving iodine in said iodine pentafluoride in the first holding zone, withdrawing a portion of iodine pentafluoride from the first holding zone and returning said portion containing dissolved iodine to the first reaction zone in contact with additional fluorine, withdrawing another portion of iodine pentafluoride and introducing said portion into a second holding zone, continuously introducing iodine pentafluoride from the second holding zone into a second reaction zone in contact with said unreacted fluorine gas from the first reaction zone to effect reaction of fluorine and iodine to produce iodine pentafluoride discharging iodine pentafluoride from the second reaction zone, directing a portion of said discharged iodine pentafluoride from said second reaction zone to said second holding zone, and withdrawing and recovering a portion of iodine pentafluoride as a product.

7. A process according to claim 6 wherein the temperatures maintained in the reaction zones are within the range of 20 to 60° C.

8. A two stage process for producing iodine pentafluoride from elemental fluorine and iodine which comprises contacting in a first stage, iodine pentafluoride with iodine to dissolve the iodine to form a solution of iodine dissolved in iodine pentafluoride, passing the solution in contact with fluorine in a first reaction zone in said first stage to convert the iodine dissolved in the iodine pentafluoride to iodine pentafluoride, returning a portion of the iodine pentafluoride for further contact with iodine to dissolve iodine in iodine pentafluoride, directing another portion to a second stage wherein the iodine pentafluoride is contacted with fluorine to effect substantially complete removal of iodine to produce iodine pentafluoride, discharging a portion of the iodine pentafluoride from the second stage as a product, returning the other portion together with the portion from the first stage for further contact with fluorine to produce iodine pentafluoride.

9. A two stage process for producing iodine pentafluoride from elemental fluorine and iodine which comprises contacting in a first stage, iodine pentafluoride with iodine to dissolve the iodine to form a solution of iodine dissolved in iodine pentafluoride, passing the solution in contact with fluorine in a first reaction zone in said first stage to convert the iodine dissolved in the iodine pentafluoride to iodine pentafluoride, returning the iodine pentafluoride for further contact with iodine to dissolve iodine in iodine pentafluoride, circulating a portion of the iodine pentafluoride containing dissolved iodine to the first reaction zone as said solution, directing another portion of said iodine pentafluoride containing dissolved iodine to a second stage wherein the iodine pentafluoride is contacted with fluorine to effect substantially complete removal of iodine to produce iodine pentafluoride, discharging a portion of the iodine pentafluoride from the second stage as a product, returning the other portion together with the portion from the first stage for further contact with fluorine to produce iodine pentafluoride.

References Cited
FOREIGN PATENTS

| | | |
|---|---|---|
| 146,298 | 5/1961 | U.S.S.R. |
| 1,104,931 | 4/1961 | Germany. |

OTHER REFERENCES

Booth et al., "The Halogen Fluorides," Chemical Review, vol. 41 (1947), pp. 422 and 423.

Mellor, Comprehensive Treatise on Inorganic and Theoretical Chemistry, vol. 2, Longmans, Green and Co., New York 1922, p. 113.

Schumb et al., "Iodine Heptafluoride," Industrial and Engineering Chemistry, vol. 42, July 1950, pp. 1383–1386.

OSCAR R. VERTIZ, *Primary Examiner.*

G. T. OZAKI, *Assistant Examiner.*